(12) United States Patent
Yamashita et al.

(10) Patent No.: US 8,493,304 B2
(45) Date of Patent: Jul. 23, 2013

(54) LIQUID CRYSTAL DISPLAY DEVICE

(75) Inventors: Yuki Yamashita, Osaka (JP); Akihiro Shoraku, Osaka (JP); Fumikazu Shimoshikiryoh, Osaka (JP); Masae Kitayama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 195 days.

(21) Appl. No.: 13/145,760

(22) PCT Filed: Aug. 27, 2009

(86) PCT No.: PCT/JP2009/064990
§ 371 (c)(1),
(2), (4) Date: Jul. 21, 2011

(87) PCT Pub. No.: WO2010/087049
PCT Pub. Date: Aug. 5, 2010

(65) Prior Publication Data
US 2011/0285612 A1    Nov. 24, 2011

(30) Foreign Application Priority Data
Jan. 27, 2009    (JP) .................................. 2009-015865

(51) Int. Cl.
*G09G 3/36* (2006.01)
(52) U.S. Cl.
USPC ........................................................ 345/87
(58) Field of Classification Search
None
See application file for complete search history.

(56) References Cited

U.S. PATENT DOCUMENTS

| | | | |
|---|---|---|---|
| 6,621,537 B1 | 9/2003 | Nakamura et al. | |
| 6,677,925 B1 | 1/2004 | Kawaguchi et al. | |
| 7,079,102 B2 * | 7/2006 | Miyachi | 345/94 |
| 2003/0133054 A1 | 7/2003 | Taguchi et al. | |

FOREIGN PATENT DOCUMENTS

| | | |
|---|---|---|
| JP | 10-232412 | 9/1998 |
| JP | 10-239699 | 9/1998 |
| JP | 2000-111937 | 4/2000 |
| JP | 2001-147420 | 5/2001 |
| JP | 2003-043948 | 2/2003 |
| JP | 2001-093734 | 3/2004 |
| JP | 2004-093734 | 3/2004 |

OTHER PUBLICATIONS

European Search Report issued in Application No. 09839238, dated Jun. 5, 2012.
International Search Report for PCT/JP2009/064990, mailed Oct. 27, 2009.

* cited by examiner

*Primary Examiner* — Jospeh Haley
(74) *Attorney, Agent, or Firm* — Nixon & Vanderhye, P.C.

(57) ABSTRACT

A liquid crystal display device includes a liquid crystal panel in which a plurality of pixels (A) are arranged. A storage capacitor (Cs) is provided in each pixel (A) of liquid crystal panel. The storage capacitor (Cs) is connected to a Cs bus line. The liquid crystal display device includes a plurality of Cs bus lines. The Cs bus line is connected to a stem line. The stem line transfers a driving signal to the storage capacitor (Cs) via the Cs bus line. The liquid crystal display device includes a bridge line, separate from the stem line, for connecting a plurality of Cs bus lines.

5 Claims, 11 Drawing Sheets

LIQUID CRYSTAL DISPLAY DEVICE

TECHNICAL FIELD

The present invention relates to a liquid crystal display device, and more particularly to a liquid crystal display device including a display section in which a plurality of pixels are arranged in a matrix pattern. Note that this application is the U.S. national phase of International Application No. PCT/JP2009/064990 filed Aug. 27, 2009, which designated the U.S., and claims priority under the Paris Convention or laws and regulations of destination countries to Japanese Patent Application No. 2009-015865filed on Jan. 27, 2009. The contents of each of which are incorporated herein by reference.

BACKGROUND ART

The liquid crystal display device is disclosed, for example, in Japanese Published Patent Application No. 2001-147420. This publication discloses a so-called active matrix-type liquid crystal display device. The liquid crystal display device includes a plurality of scanning signal lines and a plurality of data signal lines crossing the scanning signal lines. Then, when a scanning signal which instructs electrical conduction through a corresponding scanning signal line is supplied to a switching element, a corresponding data signal line and a pixel electrode are connected to each other by the switching element. Then, at the timing when the data signal line and the pixel electrode are connected to each other, the data signal supplied to the data signal line is written to the pixel electrode. This liquid crystal display device also includes a common electrode by which a common electrode signal is applied to pixels.

The liquid crystal display device may have a problem so called "side shadow". According to the publication, with the liquid crystal display device, a coupling signal according to the sum of outputs to data signal lines is generated based on the outputs. Then, based on a driving signal to be the reference of the common electrode signal and the coupling signal, a common electrode signal is generated which can suppress potential fluctuation due to the outputs to the data signal lines, as compared with a common electrode signal which is generated only from a driving signal. Thus, it is possible to prevent a so-called side shadow with low power consumption.

CITATION LIST

Patent Document
  Patent Document 1: Japanese Published Patent Application No. 2001-147420

SUMMARY OF THE INVENTION

Technical Problem

In recent years, the size of a liquid crystal display device has been increased in applications such as displays for TV sets. In order to display a video of fast-moving objects such as a sport without delay of display, a double-speed operation may be done in which the image is switched through 120 frames per second. With such a panel, a side shadow is likely to occur. The present invention proposes a totally novel solution to the side shadow problem.

Solution to the Problem

A liquid crystal display device of the present invention includes a display section in which a plurality of pixels are arranged. The liquid crystal display device includes a storage capacitor provided in each pixel of the display section. The storage capacitors are connected to storage capacitor lines, and the liquid crystal display device includes a plurality of storage capacitor lines. The storage capacitor lines are connected to stem lines. The stem line transfers a driving signal to the storage capacitor via the storage capacitor line. The liquid crystal display device includes a bridge line, separate from the stem line, for connecting a plurality of storage capacitor lines. With the liquid crystal display device, the resistance of the storage capacitor lines is reduced, and it is possible to reduce ripples occurring on the storage capacitor lines. Thus, it is possible to suppress the side shadow.

In this case, the liquid crystal display device may include a plurality of stem lines. In this ease, a plurality of storage capacitor lines are preferably connected to each stem line. It is preferred that storage capacitor lines connected to the same stem line are connected to the bridge line.

The display section of the liquid crystal display device may include a plurality of pixels arranged in a matrix pattern. In this case, it is preferred that a plurality of stem lines are arranged in a vertical direction of the display section. It is preferred that a plurality of storage capacitor lines are arranged in the horizontal direction of the display section, each storage capacitor line connected to one of the plurality of stem lines. In this case, it is preferred that the storage capacitor lines connected to the same stem line are connected together by the bridge line. Thus, it is possible to reduce ripples occurring on the storage capacitor lines without inhibiting the transfer of driving signals to storage capacitor lines. Thus, it is possible to suppress the side shadow.

Where the plurality of pixels of the display section include a plurality of sub-pixels, the bridge lines may be arranged so as to pass through one of the plurality of sub-pixels. For example, the plurality of pixels of the display sections include R, G and B sub-pixels. In this case, the bridge lines may be arranged so as to pass through the R sub-pixel, the G sub-pixel, or the B sub-pixel of the R, G and B sub-pixels.

DESCRIPTION OF EMBODIMENTS

An embodiment of the present invention will now be described with reference to the drawings. Note that members or portions serving substantially the same function are denoted by the same reference numerals as appropriate.

Figure 13:
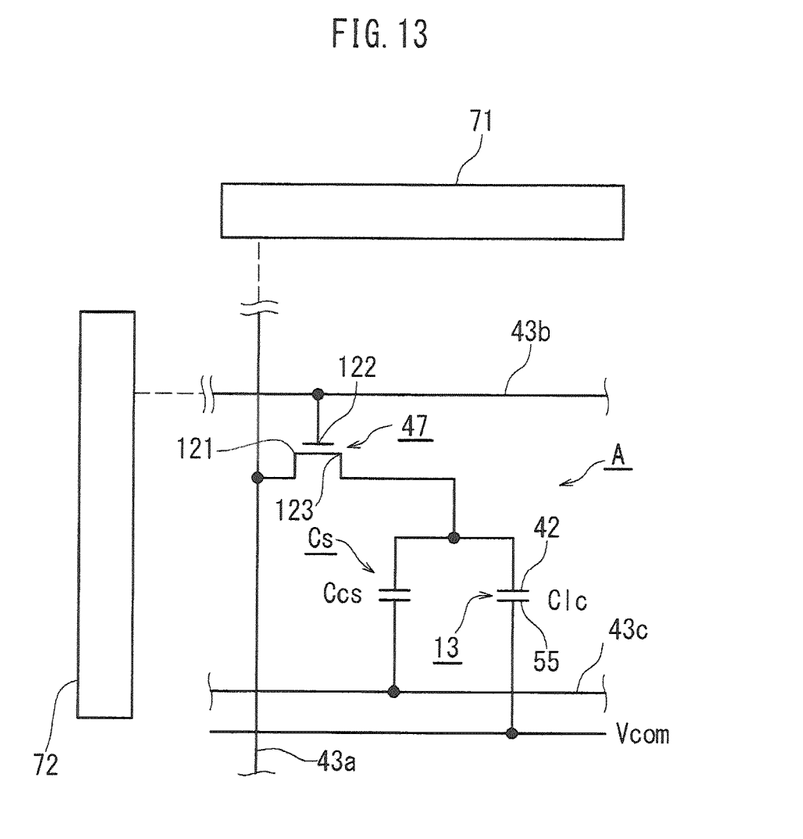
FIG. 13 is a circuit diagram showing a configuration of a pixel of a liquid crystal display device.

FIG. 13 shows an example of a circuit configuration of each pixel A of a liquid crystal display device. In FIG. 13, reference character 47 denotes a thin film transistor (TFT). Reference character Clc denotes a condenser formed by a pixel electrode 42 and a counter electrode 55 for operating a liquid crystal layer 13. Reference character Ccs denotes a condenser forming a storage capacitor Cs. Reference character 71 denotes a source driver, reference character 72 a gate driver, reference character 43a a source bus line, reference character 43b a gate bus line, and reference character 43c a Cs bus line as a storage capacitor line.

The source bus line 43a is connected to a source electrode 121 of the thin film transistor 47. The gate bus line 43b is connected to a gate electrode 122 of the thin film transistor 47. The condenser Clc operating the liquid crystal layer 13 and the storage capacitor Cs are connected to the drain electrode 123 side of the thin film transistor 47 (TFT) as shown in FIG. 13. The storage capacitor Cs is connected to the Cs bus line 43c. The storage capacitors Cs provided in the pixels A of a liquid crystal panel 10 are connected to the Cs bus line 43c.

For each pixel A of the liquid crystal display device, a required voltage is applied to the pixel electrode 42 of the pixel A from the source driver 71 through the source bus line 43a at the timing at which the thin film transistor 47 is turned ON in response to the scanning signal sent from the gate driver 72. Then, by the function of the storage capacitor Cs, the voltage applied to the pixel electrode 42 is maintained even after the thin film transistor 47 is turned OFF. Thus, the pixels A produce an intended display by operating the liquid crystal layer 13.

Figure 10:
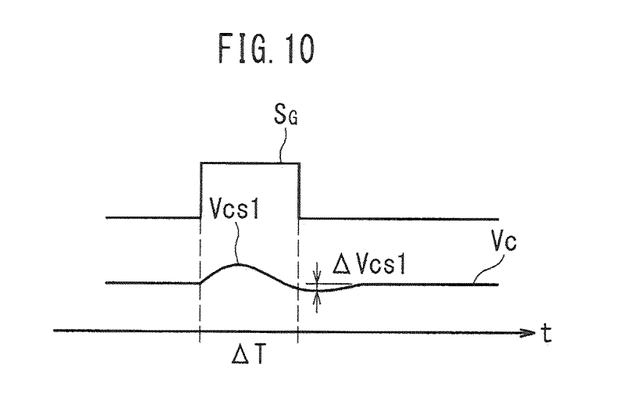
FIG. 10 is a diagram showing the relationship between a scanning signal $S_G$ and a voltage Vc occurring on a Cs bus line.

FIG. 10 shows the relationship between the scanning signal $S_G$ input to the gate bus line 43b and the voltage Vc occurring on the Cs bus line 43c. As shown in FIGS. 13 and 10, a required voltage is applied to the pixel electrode 42 of the pixel A from the source driver 71 through the source bus line 43a at the timing ΔT at which the thin film transistor 47 is turned ON in response to the scanning signal $S_G$ (pulse signal) sent from the gate driver 72. At this point, a ripple Vcs1 may occur on the Cs bus line 43c connected to the pixel electrode 42 via the storage capacitor Cs.

The ripple Vcs1 may remain on the Cs bus line 43c without attenuating even after the thin film transistor 47 is turned OFF. If the ripple Vcs1 remains on the Cs bus line 43c without attenuating, the voltages applied to the condensers Clc for operating the liquid crystal layer 13 are influenced by the ripple Vest in a plurality of pixels A connected to the Cs bus line 43c. Thus, the voltages applied to the condensers Cie for operating the liquid crystal layer 13 may be influenced by the ripple Vcs1 which has occurred on the Cs bus line 43c.

Figure 12:
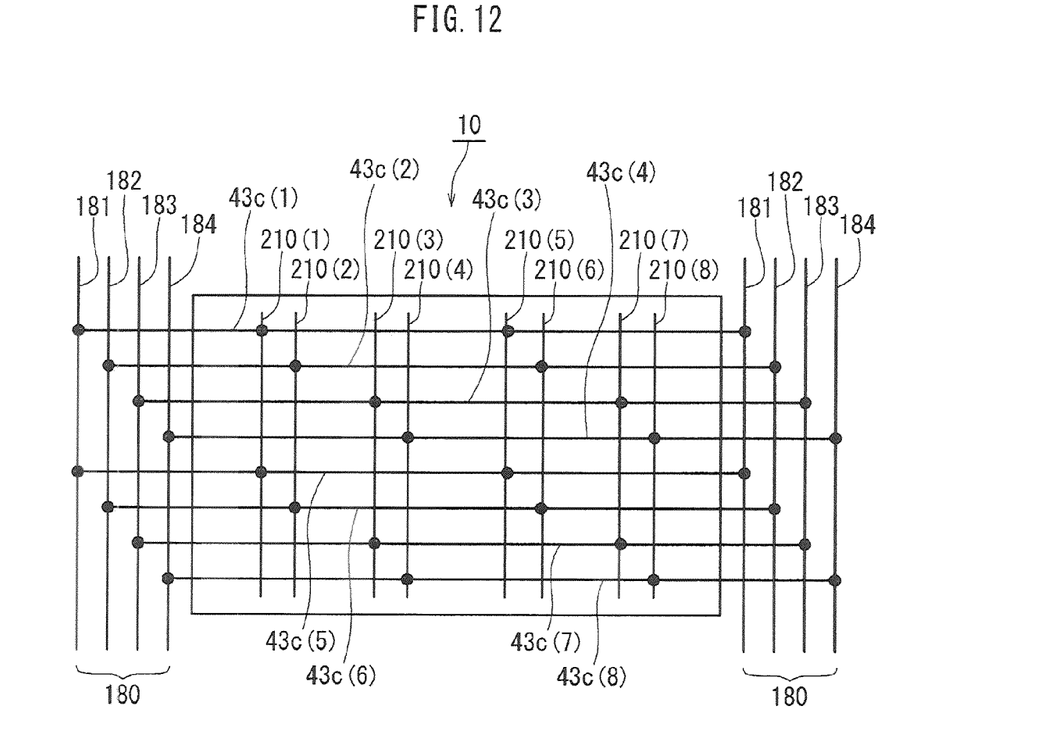
FIG. 12 is a diagram showing a wiring structure of storage capacitor lines, stem lines and bridge lines.

The present inventors assumed that the voltage fluctuation (the ripple Vcs1) occurring on the Cs bus line 43c is one of the causes of the "side shadow" and arrived at the present invention. FIG. 12 shows a wiring structure of Cs bus lines 43c(1)-(8) of a liquid crystal display device 100 according to one embodiment of the present invention. That is, the liquid crystal display device 100 includes bridge lines 210(1)-(8) for connecting the Cs bus lines 43c(1)-(8) (storage capacitor lines) in the liquid crystal panel 10, as shown in FIG. 12. With the liquid crystal display device 100, it is possible to reduce the ripple Vcs1 (see FIG. 10) occurring on the Cs bus lines 43c(1)-(8) and to suppress the occurrence of the "side shadow" by means of the bridge lines 210(1)-(8). Note that numbers in parentheses are attached to the Cs bus line 43c and the bridge line 210 for the distinction between a plurality of Cs bus lines 43c and a plurality of bridge lines 210. In the following description, numbers in parentheses are attached to the Cs bus lines 43c and the bridge lines 210 as necessary.

The liquid crystal display device 100 according to one embodiment of the present invention will now be described. Here, the structure of the liquid crystal display device 100 will first be described generally. Then, the phenomenon that the "side shadow" occurs when the bridge lines 210 are not provided in the liquid crystal display device 100 will be described. Then, how the "side shadow" can be suppressed when the bridge lines 210 are provided in the liquid crystal display device 100 will be described. Note that the embodiment to be described below is merely an example of a configuration of a liquid crystal display device. The specific configuration of the liquid crystal display device is not limited to the following embodiment.

Figure 1:
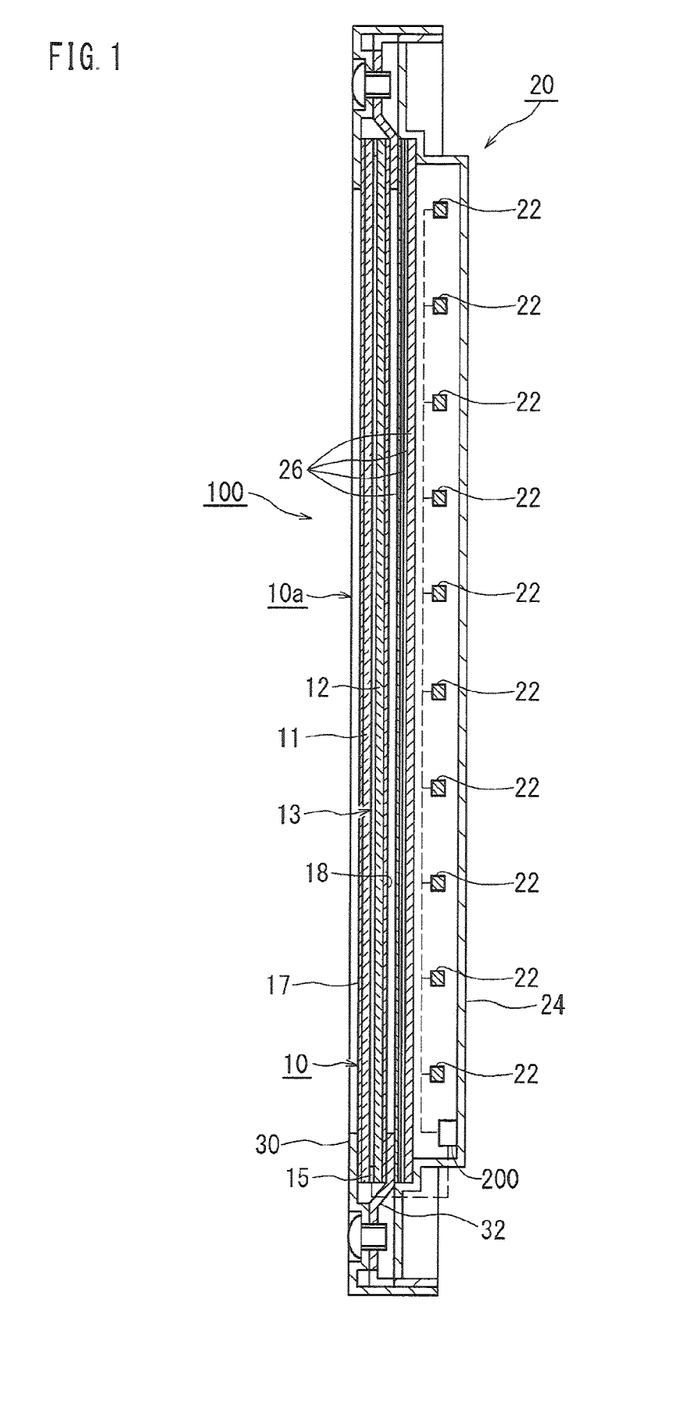
FIG. 1 is a cross-sectional view showing a liquid crystal display device according to one embodiment of the present invention.

FIG. 1 schematically shows the cross-sectional structure of the liquid crystal display device 100. As shown in FIG. 1, the liquid crystal display device 100 includes the liquid crystal panel 10 as a liquid crystal display section, and a backlight 20. The liquid crystal panel 10 of the liquid crystal display device 100 generally has a rectangular shape as a whole, and is formed by a pair of light-transmissive substrates 11 and 12 (glass substrates). In this embodiment, the front side one of the substrates 11 and 12 is a color filter substrate 11 (CF substrate), and the rear side one is an array substrate 12 (TFT substrate).

In this embodiment, as shown in FIG. 1, the color filter substrate 11 and the array substrate 12 each have a pixel region 10a (region where pixels are formed). The color filter substrate 11 and the array substrate 12 are arranged so as to oppose each other. A sealant 15 is provided between the color filter substrate 11 and the array substrate 12 so as to surround the pixel region 10a along its periphery (outer peripheral portion) in the circumferential direction.

The liquid crystal layer 13 is provided in a region between the color filter substrate 11 and the array substrate 12 that is surrounded by the sealant 15. The liquid crystal layer 13 includes a liquid crystal material including liquid crystal molecules. As a voltage is applied between the color filter substrate 11 and the array substrate 12, the alignment direction of the liquid crystal molecules in the liquid crystal layer 13 is operated to change the optical characteristics of the liquid crystal layer 11

Figure 2:
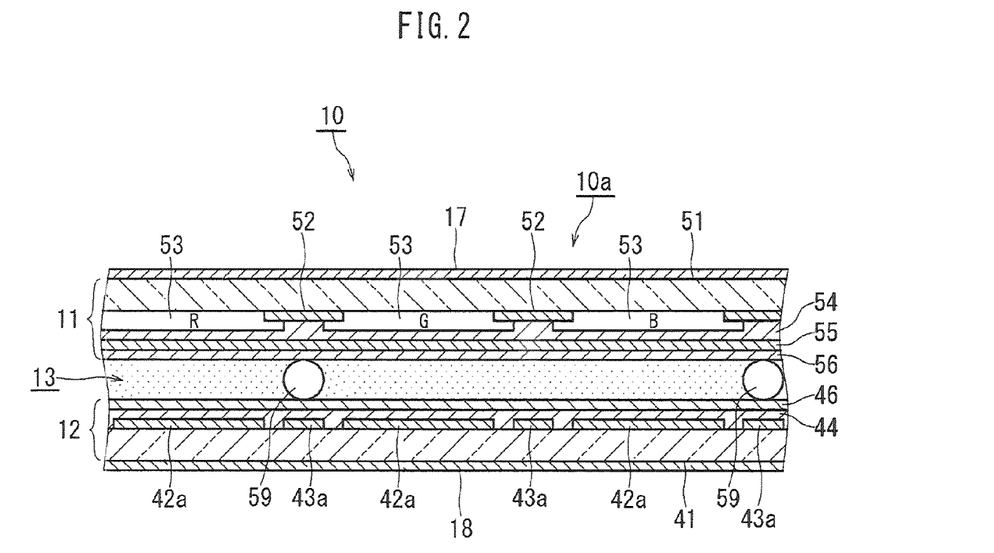
FIG. 2 is a cross-sectional view showing a liquid crystal panel of a liquid crystal display device according to one embodiment of the present invention.
Figure 3:
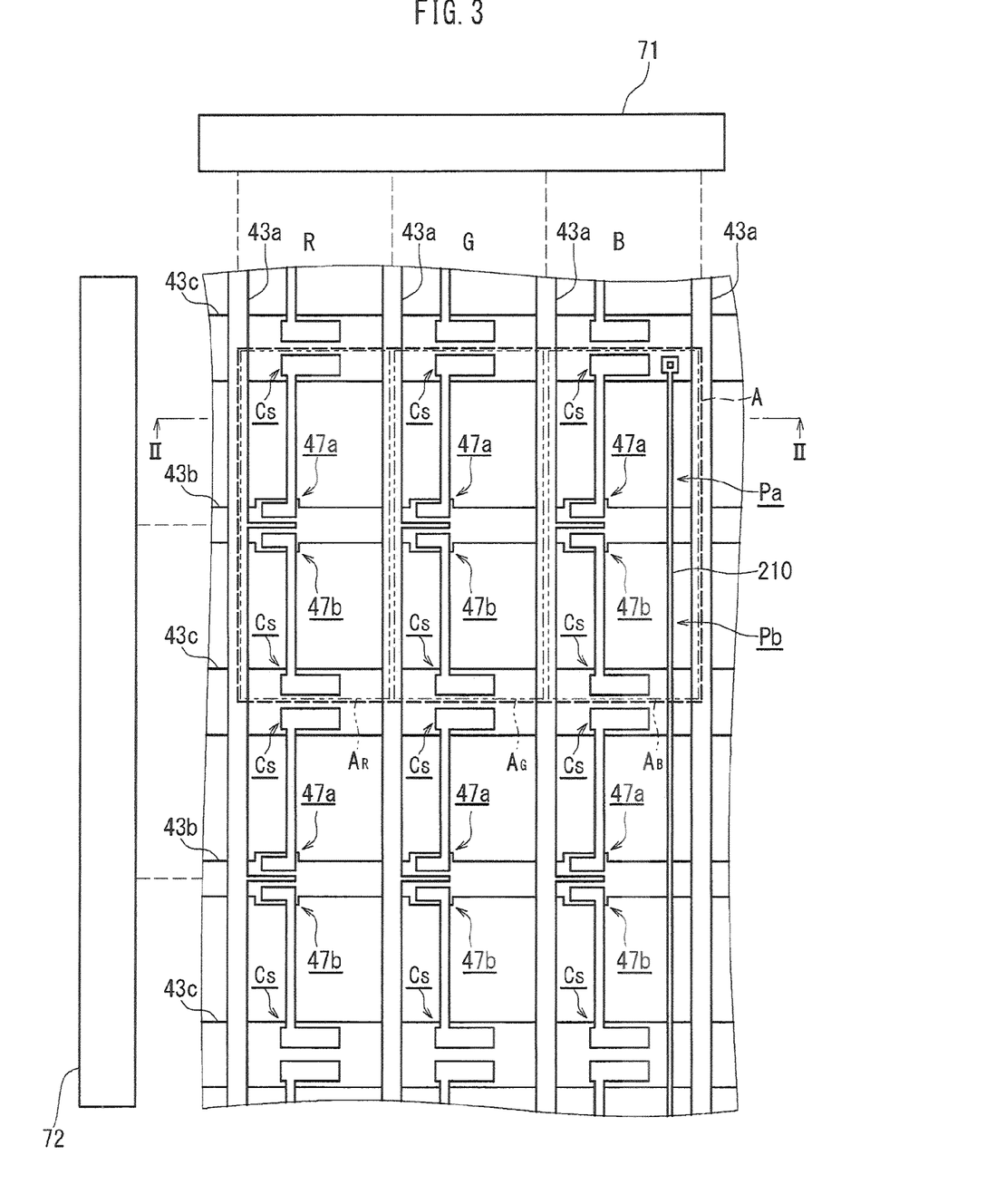
FIG. 3 is a plan view showing a pixel region portion of an array substrate of a liquid crystal display device according to one embodiment of the present invention.
Figure 4:
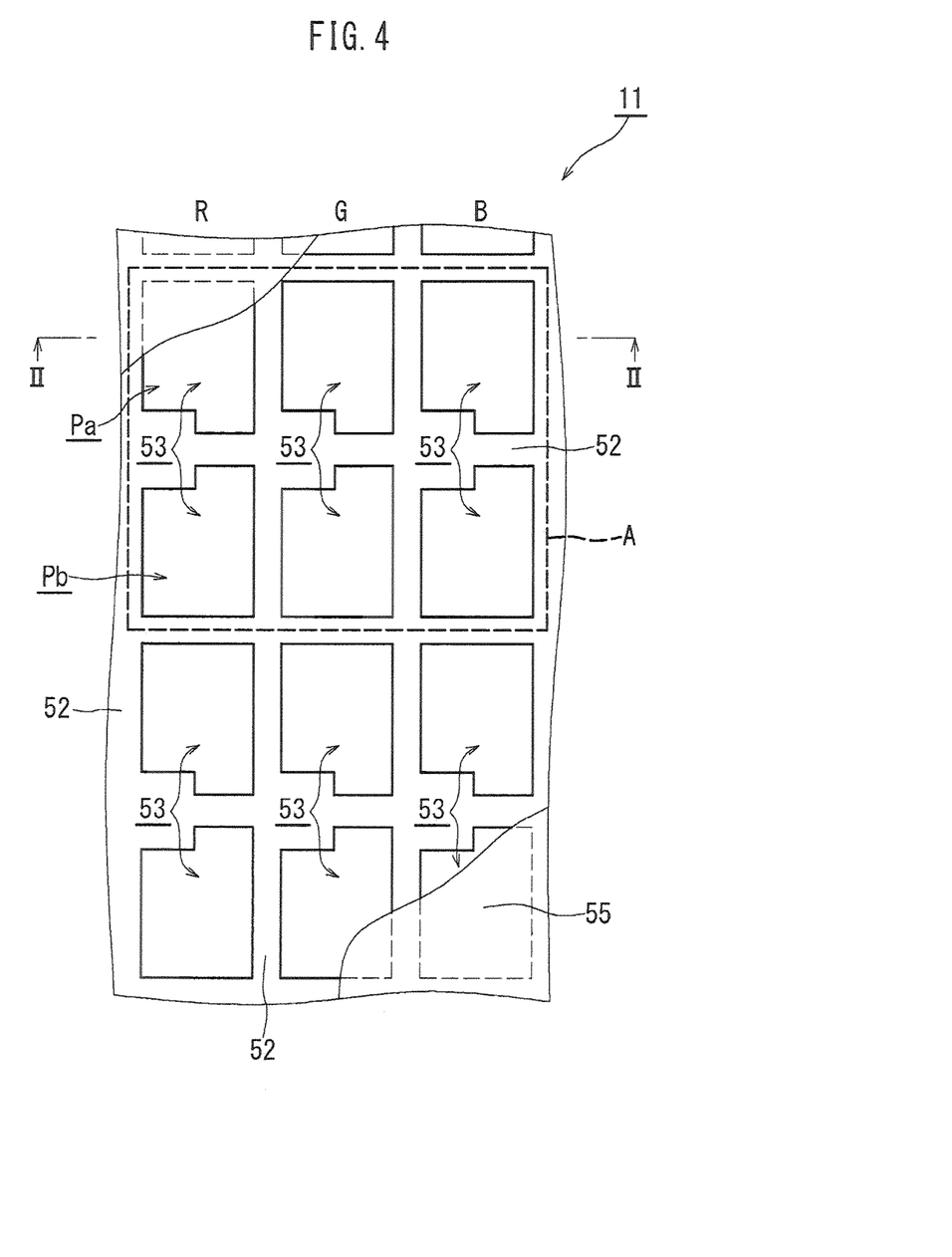
FIG. 4 is a plan view showing a pixel region portion of a color filter substrate of a liquid crystal display device according to one embodiment of the present invention.
Figure 5:
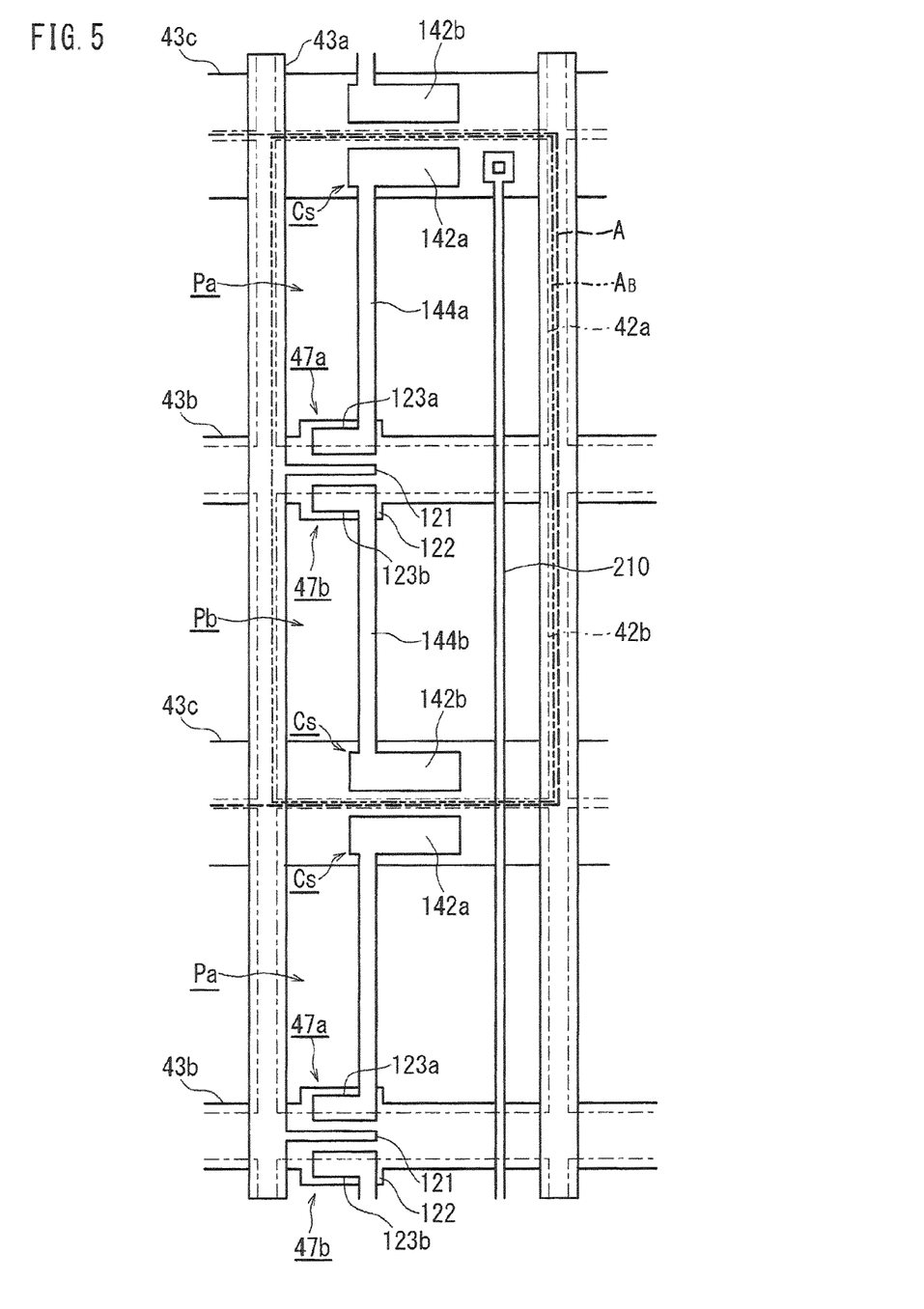
FIG. 5 is a plan view showing a configuration of sub-pixels of a liquid crystal display device according to one embodiment of the present invention.
Figure 6:
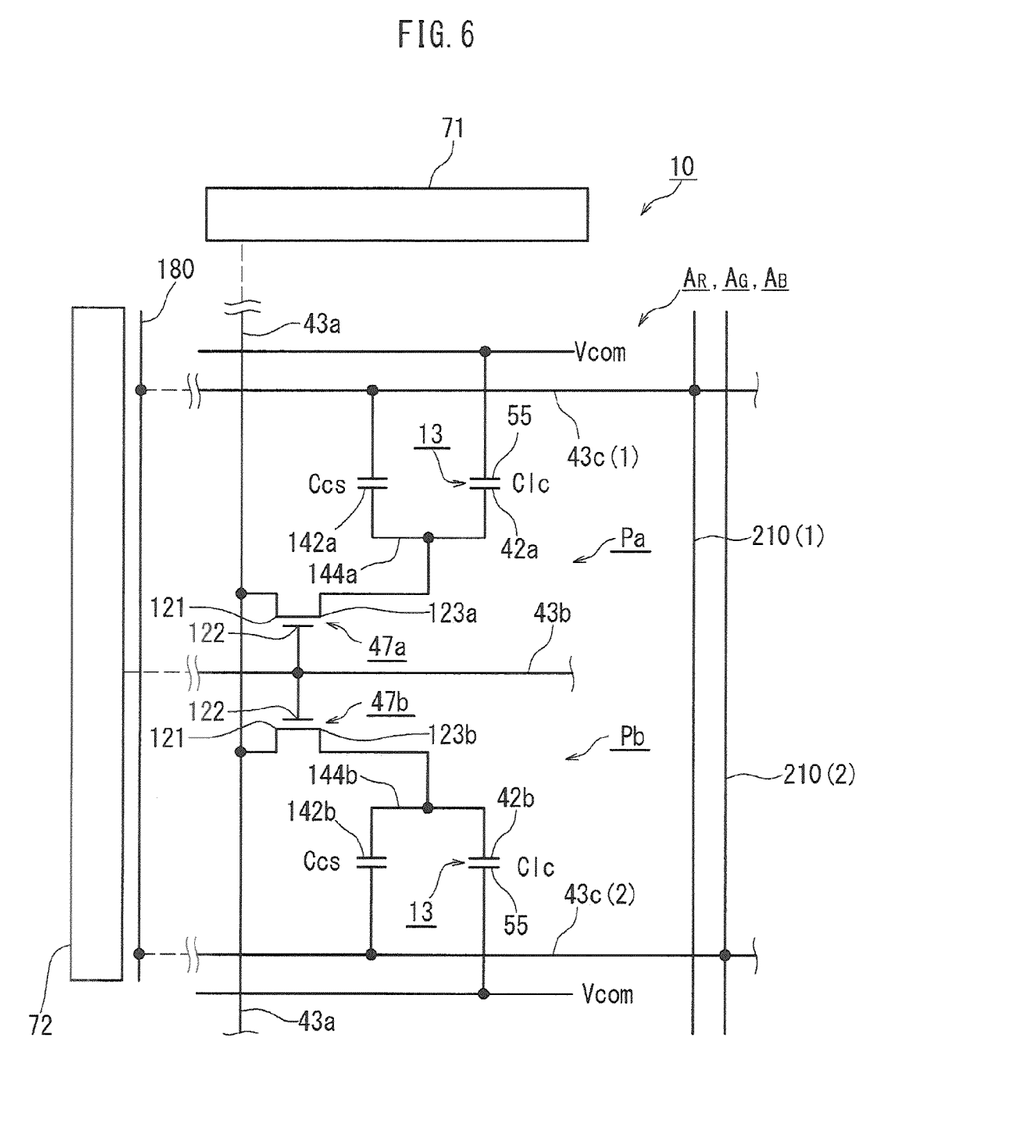
FIG. 6 is a circuit diagram showing a configuration of a sub-pixel of a liquid crystal display device according to one embodiment of the present invention.

The array substrate 12 and the color filter substrate 11 will now be described in this order. FIGS. 2 to 4 show the pixel region 10a of the liquid crystal panel 10 on an enlarged scale. FIG. 2 shows a cross-sectional view of the color filter substrate 11 and the array substrate 12 attached together. FIG. 3 shows a plan view of a pixel region portion of the array substrate 12, and FIG. 4 shows a plan view of a pixel region portion of the color filter substrate 11. The region surrounded by broken line A in FIGS. 3 and 4 denotes a region forming one pixel of the liquid crystal display device 100. The liquid crystal panel 10 includes pixels A shown in FIGS. 3 and 4 arranged in a matrix pattern. FIG. 5 is a plan view showing one sub-pixel $A_B$ of the pixel A on an enlarged scale. FIG. 6 is a circuit diagram showing a configuration of the sub-pixels $A_R, A_G, A_B$ of the pixel A.

In this embodiment, the array substrate 12 includes pixel electrodes 42a and 42b, the bus lines 43a to 43e (bus lines), a flattening layer 44, an alignment film 46 (horizontal alignment film), and thin film transistors 47a and 47b (TFTs) formed on the front side (the liquid crystal layer 13 side) of a glass substrate 41 as shown in FIGS. 2, 3 and 5. The pixel electrodes 42a and 42b are made of ITO (indium tin oxide) which is a transparent conductive material, and voltages according to the image are supplied to these pixel electrodes 42a and 42b at a predetermined timing via the bus lines 43a to 43c and the thin film transistors 47a and 47b (see FIG. 3). The flattening layer 44 is formed by an insulating material, and covers the pixel electrodes 42a and 42b and the bus lines 43a to 43c (see FIG. 3). The alignment film 46 made of polyimide, or the like, is formed on the flattening layer 44. A rubbing treatment is performed on the surface of the alignment film 46 so as to determine the alignment direction of the liquid crystal molecules in the absence of an applied voltage. In this embodiment, the array substrate 12 includes the storage capacitors Cs. The structure of the storage capacitors Cs will later be described in detail.

The color filter substrate 11 includes a black matrix 52, color filters 53, a flattening layer 54, the counter electrode 55 and an alignment film 56 (horizontal alignment film) formed on the rear side (the liquid crystal layer 13 side) of a glass substrate 51 as shown in FIGS. 2 and 4. The black matrix 52 is formed by a metal such as Cr (chromium) so that light does not pass through a region between pixels. There are three colors of color filters 53, i.e., red (R), green (G) and blue (B), and one of the R, G and B color filters 53 opposes one of the pixel electrodes 42a and 42b of the array substrate 12 as shown in FIGS. 2 to 4. The flattening layer 54 is formed so as to cover the black matrix 52 and the color filters 53 as shown in FIG. 2, and the counter electrode 55 made of ITO (indium tin oxide) is formed under the flattening layer 54. The alignment film 56 is formed under the counter electrode 55. A rubbing treatment is performed also on the surface of the alignment film 56. Note that the alignment direction of the alignment film 46 of the array substrate 12 and the alignment direction of the alignment film 56 of the color filter substrate 11 differ from each other by 90°.

The glass substrates 41 and 51 are arranged with spherical or columnar spacers 59 (spherical in the illustrated example) interposed therebetween as shown in FIG. 2. The spacers 59 are for example formed by plastic, glass, or the like. The gap between the glass substrates 41 and 51 is held by the sealant 15 (see FIG. 1) described above and the spacers 59, thereby constantly maintaining the liquid crystal layer 13.

Moreover, as shown in FIGS. 1 and 2, polarizer plates 17 and 18 are attached to the front side of the color filter substrate 11 (the glass substrate 51) and the rear side of the array substrate 12 (the glass substrate 41), respectively. In a so-called normally white liquid crystal display device, the two polarizer plates 17 and 18 are arranged so that the polarization axes thereof are orthogonal to each other. In a so-called normally black liquid crystal display device, the two polarizer plates 17 and 18 are arranged so that the polarization axes thereof are parallel to each other. In this embodiment, a bezel 30 is attached to the front side of the liquid crystal panel 10 as shown in FIG. 1. A frame 32 is attached to the rear side of the liquid crystal panel 10. The bezel 30 and the frame 32 support the liquid crystal panel 10. Moreover, the frame 32 has an opening across the area corresponding to the pixel region 10a of the liquid crystal panel 10. The backlight 20 supported by a backlight chassis 24 is attached to the rear side of the liquid crystal panel 10.

As shown in FIG. 1, the backlight 20 is an external light source arranged on the rear side (the right side in FIG. 1) of the liquid crystal panel 10. In this embodiment, the backlight 20 includes a plurality of light sources 22 (e.g., a cold cathode tube, light emitting diodes (LEDs), etc.) and the backlight chassis 24. The backlight chassis 24 has a box shape with an opening facing the front side (the liquid crystal panel 10 side), and a plurality of light sources 22 are arranged in the backlight chassis 24. A plurality of optical sheets 26 are arranged so as to be stacked together in the opening of the backlight chassis 24.

The optical sheet 26 includes, for example, a diffuser plate, a diffuser sheet, a lens sheet and a luminance enhancing sheet in this order from the rear side. The backlight chassis 24 is attached to the rear side of the frame 32 with the light sources 22 facing the liquid crystal panel 10 described above. Then, the optical sheet 26 is interposed between the rear surface of the frame 32 of the liquid crystal panel 10 and the front surface of the backlight chassis 24. The liquid crystal display device 100 includes a control section 200 as shown in FIG. 1. The control section 200 includes a circuit (e.g., a light modulating circuit such as a cold cathode tube inverter circuit) for adjusting the luminance (brightness) of the backlight 20 according to the image or video to be displayed. The control section 200 adjusts the brightness of the backlight 20 by for example adjusting the power to be input to the light sources 22.

The liquid crystal display device 100 operates the liquid crystal molecules in the liquid crystal layer 13 by applying a controlled voltage to the color filter substrate 11 and the array substrate 12 of the liquid crystal panel 10. With the liquid crystal panel 10, the liquid crystal molecules in the liquid crystal layer 13 are operated for each of the pixels A (more specifically the sub-pixels $A_R, A_G$ and $A_B$ defined by R, G and B). Thus, each pixel A can block light from the backlight 20 or change the transmittance for light to be transmitted therethrough. Moreover, the liquid crystal display device 100 displays an intended image while controlling the luminance of the backlight 20, etc. Note that each of the sub-pixels $A_R, A_G$ and $A_B$ defined by R, G and B is further divided into two subordinate pixels Pa and Pb in this embodiment as shown in FIG. 3.

The driving structure of the liquid crystal panel 10 will now be further described.

In the array substrate 12 shown in FIG. 3, the bus line 43a is a source bus line (data signal line) for sending a signal (data signal) to the sources of the thin film transistors 47a and 47b. The bus line 43b is a gate bus line (scanning signal line) for sending a signal (scanning signal) to the gates of the thin film transistors 47a and 47b. The bus line 43c is a bus line (Cs bus line, storage capacitor line) for the storage capacitors Cs. In this embodiment, the source bus lines 43a are arranged so as to run vertically between the sub-pixels $A_R, A_G$ and $A_B$ defined by R, G and B. The gate bus lines 43b are arranged so as to run horizontally in the central portions of the sub-pixels $A_R, A_G$ and $A_B$. The Cs bus lines 43c are arranged so as to run horizontally through the intervals of the sub-pixels $A_R, A_G$ and $A_B$ in the vertical direction. The source bus lines 43a are connected to the source driver 71. The gate bus lines 43b are connected to the gate driver 72. The Cs bus lines 43c are connected to stem lines 180 (see FIG. 6, FIG. 7).

In this embodiment, in each of the sub-pixels $A_R$, $A_G$ and $A_B$, the thin film transistors 47a and 47b (TFTs) are provided at the intersection between the source bus line 43a and the gate bus line 43b as shown in FIGS. 5 and 6. The thin film transistors 47a and 47b include the source electrode 121, the gate electrode 122 and drain electrodes 123a and 123b. In this embodiment, the source electrode 121 extends from the source bus line 43a to the position where the thin film transistors 47a and 47b are provided. The source electrode 121 is shared by the upper and lower thin film transistors 47a and 47b. The gate electrode 122 is provided in the gate bus line 43b. The drain electrodes 123a and 123b are provided in the areas of the upper and lower subordinate pixels Pa and Pb, respectively. A semiconductor (not shown) is present between the source electrode 121, the gate electrode 122 and the drain electrodes 123a and 123b. Although not shown in the figure, the drain electrodes 123a and 123b are connected to the pixel electrodes 42a and 42b through contact holes running through an interlayer insulating film.

The subordinate pixels Pa and Pb each include the storage capacitor Cs. The storage capacitor Cs includes the Cs bus line 43c and a storage capacitor electrode 142a or 142b opposing the Cs bus line 43c. The storage capacitor electrodes 142a and 142b are connected to the drain electrodes 123a and 123b of the thin film transistors 47a and 47b by lead lines 144a and 144b, respectively. An insulating film is interposed between the Cs bus line 43c and the storage capacitor electrode 142a or 142b, thus forming a condenser (Ccs) as the storage capacitor Cs.

Figure 7:
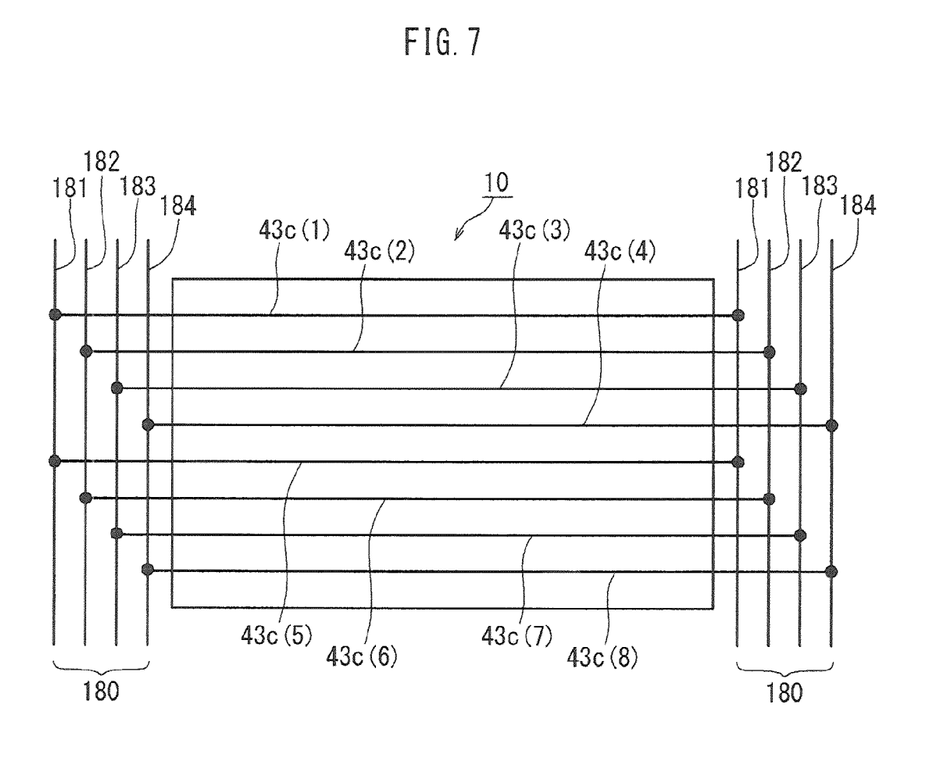
FIG. 7 is a diagram showing a wiring structure of storage capacitor lines and stem lines.

The Cs bus lines 43c are connected to the stem lines 180. The stem lines 180 are provided along peripheral portions of the liquid crystal panel 10 (opposite side portions of the liquid crystal panel 10 in this embodiment). FIG. 7 is a diagram showing the connection structure of the Cs bus lines 43c and the stem lines 180.

In this embodiment, the stem lines 180 include a plurality of stem lines 181 to 184 as shown in FIG. 7. A plurality of Cs bus lines 43c are arranged in the horizontal direction of the liquid crystal panel 10, and the storage capacitors Cs of a series of subordinate pixels Pa or Pb arranged in the horizontal direction of the liquid crystal panel 10 are connected to each of the Cs bus lines 43c. Ones of the Cs bus lines 43c that are at regular intervals of several lines in the vertical direction of the liquid crystal panel 10 are connected to the same one of the stem lines 181 to 184.

In the example shown in FIG. 7, eight Cs bus lines 43c(1)-(8) are arranged sequentially in the horizontal direction of the liquid crystal panel 10. In this case, ones of the Cs bus lines 43c that are at regular intervals of four lines in the vertical direction of the liquid crystal panel 10 are connected to the same one of the stem lines 181 to 184. That is, the Cs bus lines 43c(1) and 43c(5) are connected to the stem line 181. The Cs bus lines 43c(2) and 43c(6) are connected to the stem line 182. The Cs bus lines 43c(3) and 43c(7) are connected to the stem line 183. The Cs bus lines 43c(4) and 43c(8) are connected to the stem line 184. Note that although not shown in the figure, the Cs bus lines 43c connected to the storage capacitors Cs provided in the subordinate pixels Pa and Pb of the liquid crystal panel 10 are preferably connected to different stem lines.

Note that while ones of the Cs bus lines 43c that are at regular intervals of four lines in the vertical direction of the liquid crystal panel 10 are connected to the same one of the stem lines 181 to 184 in the example shown in FIG. 7, there are actually cases where more stem lines (e.g., 12 stem lines) are provided in the liquid crystal panel 10. Although not shown in the figure, where 12 stem lines are provided, for example, it is preferred that ones of the Cs bus lines 43c that are at regular intervals of 12 lines in the vertical direction of the liquid crystal panel 10 are connected to the same stem line. FIG. 7 shows an embodiment where the bridge lines 210(1)-(8) (see FIG. 12) are not provided for the purpose of discussion.

Figure 8:
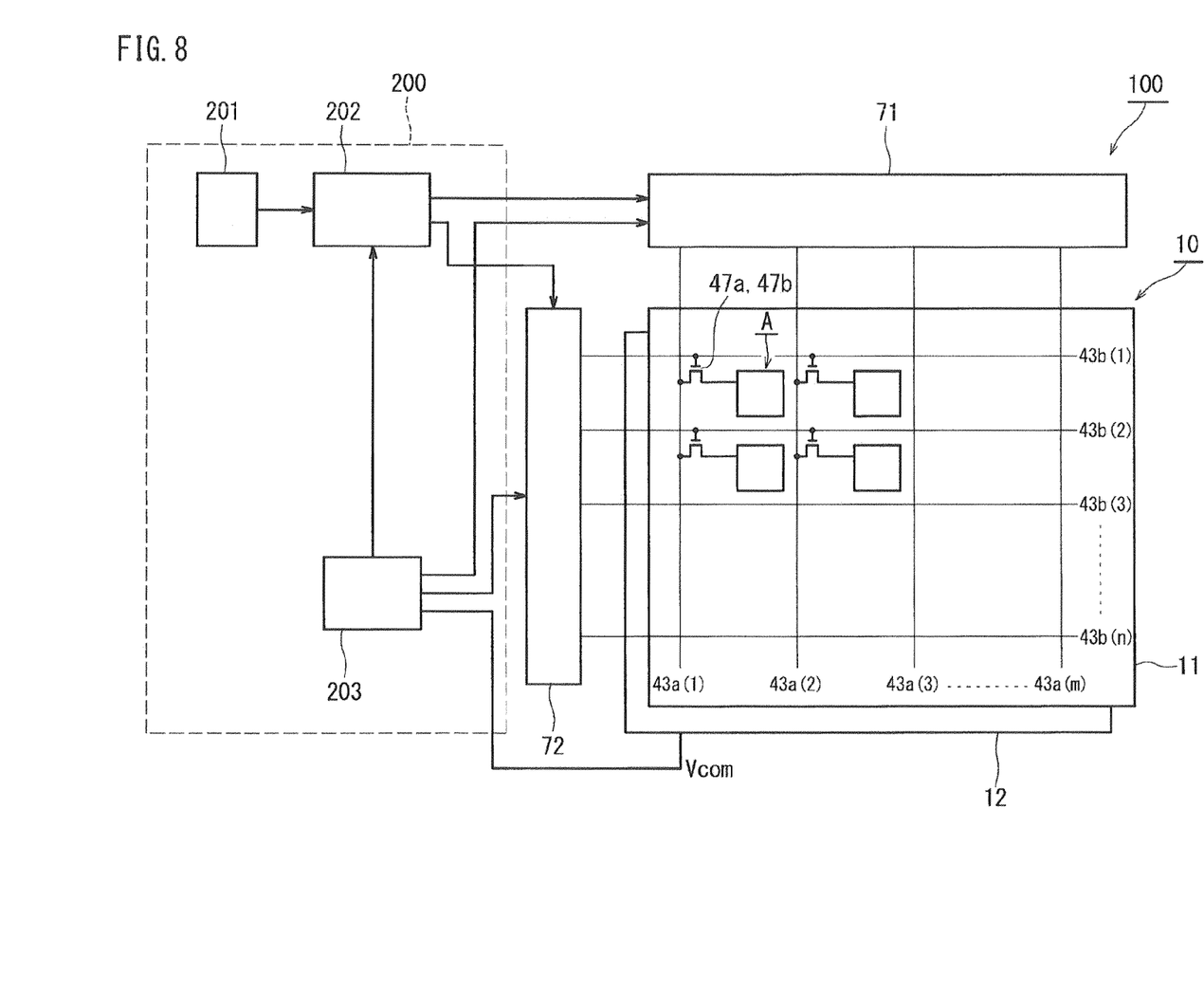
FIG. 8 is a block diagram showing a driving structure of a liquid crystal display device according to one embodiment of the present invention.

As shown in FIGS. 5 and 6, with the liquid crystal display device 100, the pixel electrodes 42a and 42b are charged by the source bus line 43a, the gate bus line 43b, the Cs bus line 43c and the thin film transistors 47a and 47b. As shown in FIGS. 2 and 5, a condenser (Clc) is formed between the pixel electrode 42a, 42b and the counter electrode 55 on the side of the color filter substrate 11 opposing the pixel electrode 42a, 42b with the liquid crystal layer 13 interposed therebetween. The subordinate pixels Pa and Pb of the liquid crystal display device 100 operate normally by holding the charge stored in the two condensers (Ccs and Clc). FIG. 8 is a block diagram showing the driving structure of the liquid crystal panel 10.

The liquid crystal display device 100 includes the control section 200 as shown in FIG. 8. The control section 200 is formed by a combination of ICs, LSIs, CPU, non-volatile memories, etc. The control section 200 performs required functions by performing various electronic processes in accordance with a prescribed program. The operation of the liquid crystal panel 10 is controlled by the control section 200. The control section 200 includes a signal input section 201, a timing control section 202, and a power supply 203.

The signal input section 201 receives a plurality of control signals from an external system (not shown). The control signals input from the external system include signals relating to the video to be displayed on the liquid crystal panel 10. In this embodiment, control signals are sent to the source driver 71 and the gate driver 72 through the timing control section 202 based on the control signals input to the signal input section 201. Based on the plurality of control signals input from the external system (not shown), the timing control section 202 generates a control signal for operating the gate driver 72 and the source driver 71. The power supply 203 supplies the operation power to various components of the liquid crystal display device 100, and generates a common electrode voltage (Vcom) of the liquid crystal panel 10 and supplies it to the counter electrode 55.

In this embodiment, as shown in FIG. 8, the source bus line 43a(1) to the source bus line 43a(m), which are routed along the rows of the matrix of the pixels A (accurately, the R, G and B sub-pixels $A_R$, $A_G$ and $A_B$ of the pixels A) of the liquid crystal panel 10, are connected to the source driver 71. In response to the control signal input from the timing control section 202, the source driver 71 selects a reference voltage to be input to the pixels A and supplies the selected reference voltage to the pixels A.

In response to the control signal input from the timing control section 202, the gate driver 72 turns ON/OFF the thin film transistors 47a and 47b arranged on the liquid crystal panel 10. Signals are sent to the gate bus lines 43b(1)-(n) on the liquid crystal panel 10. When a control signal for turning ON the thin film transistors 47a and 47b is sent to one gate bus line 43b, the thin film transistors 47a and 47b of pixels that are connected to the gate bus line 43b are turned ON by the signal. The gate driver 72 sends control signals (scanning signals) for turning ON the thin film transistors 47a and 47b sequentially to the gate bus lines 43b(1)-(n).

The timing of control signals (data signals and scanning signals) to be sent to the source driver 71 and the gate driver 72 is adjusted. That is, the gate driver 72 sends a control signal (scanning signal) for turning ON the thin film transistors 47a and 47b to one of the plurality of gate bus lines 43b(1)-(n) on the liquid crystal panel 10. At this timing, a control signal (data signal) for controlling a plurality of pixels connected to the gate bus line 43b is sent from the source driver 71. The amount of time required for the gate driver 72 to turn ON all the pixels connected to one gate bus line 43b is referred to as one horizontal sync period. As the gate driver 72 turns ON the pixels connected to one gate bus line 43b, the thin film transistors 47a and 47b of the pixels are ON during one horizontal sync period. In the next horizontal sync period, the thin film transistors 47a and 47b of the pixels connected to the gate bus line 43b are turned OFF.

The source driver 71 sends a control signal (data signal) to one of the source bus lines 43a(1)-(m) for each horizontal sync period. Thus, at the timing when the thin film transistors 47a and 47b of a pixel connected to one gate bus line 43b are turned ON, a control signal (data signal) is sent to the pixel A. Thus, with the liquid crystal panel 10, information is sequentially written to the pixel electrodes 42a and 42b row by row. One image displayed on the liquid crystal panel 10 is formed by writing information to the pixel electrodes 42a and 42b for all rows of the liquid crystal panel 10. When displaying a video, the video is divided into a plurality of chronologically-arranged still images. By sequentially displaying the chronologically-arranged still images, the video is displayed on the liquid crystal panel 10. Note that the period of time for which one image is formed on the liquid crystal panel 10 is referred to as a frame period.

In this embodiment, one pixel A includes sub-pixels $A_R$, $A_G$ and $A_B$ defined by R, G and B as shown in FIGS. 3 and 5. Moreover, each sub-pixel $A_R$, $A_G$, $A_B$ is divided into two subordinate pixels Pa and Pb. With such a so-called multi-picture element structure, even if there is a pixel defect in one of the two subordinate pixels Pa and Pb, for example, the influence of the pixel defect is reduced if the other subordinate pixel is functioning. This embodiment is advantageous in that it is possible to suppress the reduction in the proportion of normal pixels. In this embodiment, the subordinate pixels Pa and Pb have different brightnesses, wherein one (e.g., the upper subordinate pixel Pa) forms a brighter pixel while the other (e.g., the lower subordinate pixel Pb) forms a darker pixel. In such a case, the luminance of each of the R, G and B sub-pixels $A_R$, $A_G$ and $A_B$ can be adjusted more finely, enriching representation such as half-tone colors.

Figure 9:
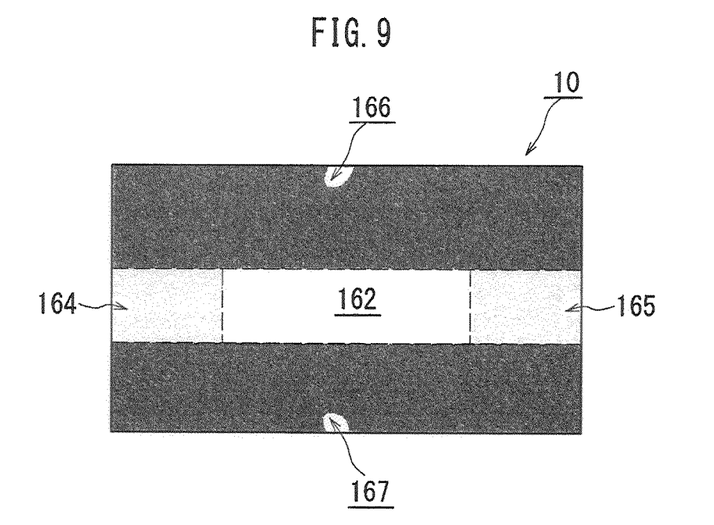
FIG. 9 is a diagram showing an example of a side shadow occurring in a liquid crystal display device according to one embodiment of the present invention.

The phenomenon that the "side shadow" occurs in the liquid crystal display device 100 will now be described.

Where the liquid crystal panel 10 is of a normally black type, the so-called "side shadow" is typically seen when an area 162 where white is displayed is formed in a central portion of the gray display as shown in FIG. 9. In this case, the phenomenon where gray display areas 164 and 165 on opposite sides of the area 162 where white is displayed become more whitish than other gray display areas 166 and 167 is the "side shadow". Similarly, where the liquid crystal panel 10 is of a normally white type, the "side shadow" is typically seen in the liquid crystal panel 10 when an area 162 where gray (black) is displayed (see FIG. 9) is formed in a central portion of the white display. In this case, the phenomenon where the white display areas 164 and 165 on opposite sides of the area 162 where gray (black) is displayed become more blackish than other white display areas 166 and 167 is the "side shadow".

With the normally black type, for example, the gray display areas 164 to 167 are displayed by setting the voltage applied to the pixels A to be lower than a predetermined voltage, thereby controlling the orientation of the liquid crystal so as to block light with the liquid crystal layer. In contrast, the area 162 where white is displayed is displayed by applying a required voltage to the pixels A, thereby allowing light to be transmitted through the liquid crystal layer. The "side shadow" is a phenomenon where the gray display areas 164 and 165, on opposite sides of the area 162 where white is displayed, of the gray display areas 164 to 167 appear more whitish than the other gray display areas 166 and 167. In this case, it is believed that the applied voltage acting upon the pixel electrodes 42a and 42b of the gray display areas 164 and 165 which appear whitish has increased due to some factors.

Figure 11:
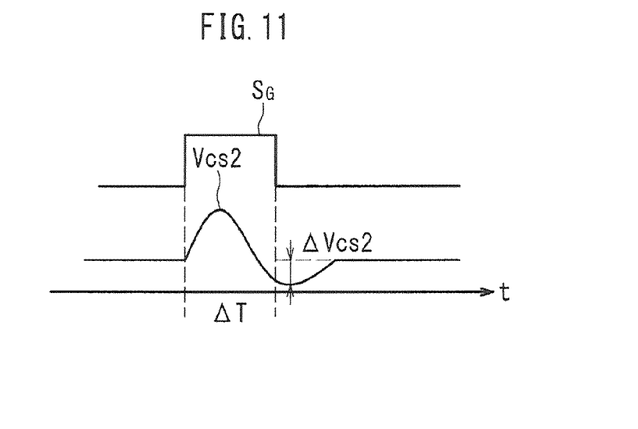
FIG. 11 is a diagram showing the relationship between a scanning signal $S_G$ and a voltage Vc occurring on a Cs bus line.

The present inventors believe that one of the causes of the "side shadow" is the voltage fluctuation (ripple) occurring on the Cs bus line 43c. Therefore, the present inventors examined the relationship between the scanning signal (herein, a pulse signal) input to the gate bus line 43b and the voltage occurring on the Cs bus line 43e as shown in FIGS. 10 and 11. FIG. 10 shows the relationship between the pulse signal input to the gate bus line 43b and the voltage occurring on the Cs bus line 43c in the gray display areas 166 and 167 where there is no area 162 where white is displayed along the gate bus line 43b. In contrast, FIG. 11 shows the relationship between the pulse signal input to the gate bus line 43b and the voltage occurring on the Cs bus line 43c in the gray display areas 164 and 165 where there is the area 162 where white is displayed along the gate bus line 43b.

In this case, as shown in FIGS. 10 and 11, voltage fluctuations Vcs1 and Vcs2 (ripples) occur on the Cs bus line 43c both at the timing ΔT at which the thin film transistors 47a and 47b are turned ON in the gray display areas 164 to 167. This is because a required voltage is applied from the source bus line 43a to the pixel electrodes 42a and 42b at the timing ΔT at which the thin film transistors 47a and 47b are turned ON. That is, the pixel electrodes 42a and 42b are connected to the Cs bus line 43c via the storage capacitor Cs. Therefore, when a required voltage is applied from the source bus line 43a to the pixel electrodes 42a and 42b at the timing ΔT, the voltage fluctuations Vcs1 and Vcs2 (ripples) occur on the Cs bus line 43c. The voltage fluctuations Vcs1 and Vcs2 attenuate over time. However, voltage fluctuations ΔVcs1 and ΔVcs2 may remain on the Cs bus line 43c after the timing ΔT.

In the gray display areas 166 and 167, there is no area 162 where white is displayed along the gate bus line 43b as shown in FIG. 9. In contrast, in the gray display areas 164 and 165, there is the area 162 where white is displayed along the gate bus line 43b (not shown). With the normally black type, in the area 162 where white is displayed, the voltage applied from the source bus line 43a to the pixel electrodes 42a and 42b is higher than the gray display areas 164 to 167. The pixel electrodes 42a and 42b of the gray display areas 164 and 165 where there is the area 162 where white is displayed along the gate bus line 43b electrically influence each other via the drain electrodes 123a and 123b of the TFTs, the storage capacitor Cs and the Cs bus line 43c, as shown in FIGS. 3 and 5. Therefore, as shown in FIGS. 10 and 11, the voltage fluctuations Vcs1 and Vcs2 occurring on the Cs bus line 43e are greater in the gray display areas 164 and 165 than in the gray display areas 166 and 167 (see FIG. 9). The voltage fluctuation ΔVcs remaining on the Cs bus line 43c after the timing ΔT at which the thin film transistors 47a and 47b are turned ON is greater in the gray display areas 164 and 165 than in the gray display areas 166 and 167.

The voltage fluctuation ΔVcs occurring on the Cs bus line 43c influences the pixel electrodes 42a and 42b via the storage capacitor Cs (Ccs) as shown in FIG. 6. As shown in FIGS. 10 and 11, the voltage fluctuation ΔVcs remaining on the Cs bus line 43c after the timing ΔT at which the thin film transistors 47a and 47b are turned ON is greater in the gray display areas 164 and 165 than in the other gray display areas 166 and 167. The voltage applied to the pixel electrodes 42a and 42b may be increased by the voltage fluctuation ΔVcs. Therefore, with the normally black type, the regions 164 and 165 which are supposed to produce gray display may appear whitish as shown in FIG. 9.

The present inventors conducted various studies in order to improve the phenomenon, thereby arriving at connecting a plurality of Cs bus lines 43c together by the bridge lines 210(1)-(8) as shown in FIG. 12. FIG. 12 shows an embodiment where four stem lines 181 to 184 are provided along the peripheral portion of the liquid crystal panel 10 for the purpose of illustration. The Cs bus lines 43c(1)-(8) are each connected to one of the stem lines 181 to 184. A plurality of Cs bus lines 43c are connected to each of the stem lines 181 to 184. The bridge lines 210(1)-(8) each connect together some of the Cs bus lines 43c(1)-(8) that are connected to the same one of the stem lines 181 to 184 in the liquid crystal panel 10.

How the "side shadow" is suppressed when the bridge lines 210 are provided in the liquid crystal display device 100 will now be described.

That is, in the example shown in FIG. 12, the bridge line 210(1) is connected to the Cs bus lines 43c(1) and 43c(5) which are connected to the stem line 181. The bridge line 210(2) is connected to the Cs bus lines 43c(2) and 43c(6) which are connected to another stem line 182. The bridge line 210(3) is connected to the Cs bus lines 43c(3) and 43c(7) which are connected to another stein line 183. The bridge line 210(4) is connected to the Cs bus lines 43c(4) and 43c(8) which are connected to another stem line 184.

In this case, since a plurality of Cs bus lines 43c are connected by the bridge lines 210(1)-(8), the resistance of the Cs bus line 43c is reduced. Since the bridge lines 210(1)-(8) parallelly connect the plurality of Cs bus lines 43c, the voltage fluctuations Vcs1 and Vcs2 occurring on the Cs bus line 43c (see FIGS. 10 and 11) are suppressed to be small. Since the voltage fluctuations Vcs1 and Vcs2 are reduced, the voltage fluctuations ΔVcs1 and ΔVcs2 remaining on the Cs bus line 43c after the timing ΔT at which the thin film transistors 47a and 47b are turned ON can also be suppressed to be small. Thus, the occurrence of the "side shadow" can be reduced.

In this embodiment, a plurality of Cs bus lines 43c are connected to each of the stem lines 181 to 184. Each of the bridge lines 210(1)-(8) connects together ones of the Cs bus lines 43c(1)-(8) that are connected to the same one of the stem lines 181 to 184. Therefore, the influence of the voltage fluctuation Vesl does not reach Cs bus lines 43c(1)-(8) that are connected by different stem lines 181 to 184.

In this embodiment, the liquid crystal panel 10 includes a plurality of pixels A arranged in a matrix pattern. A plurality of the Cs bus lines 43c are arranged in the horizontal direction of the liquid crystal panel 10. Ones of the Cs bus lines 43c that are at regular intervals of several lines in the vertical direction are connected to the same one of the stem lines 181 to 184. In this embodiment, even within the same pixel A, the Cs bus lines 43c are connected to different stem lines 181 to 184 in the subordinate pixels Pa and Pb, for example, as shown in FIG. 3. Therefore, even within the same pixel A, the Cs bus lines 43c passing through the subordinate pixels Pa and Pb are connected to different bridge lines 210(1)-(8).

For example, in this embodiment, as shown in FIGS. 6 and 12, the subordinate pixels Pa and Pb within the same pixel A are controlled by the same gate bus line 43b. Then, the timing at which the thin film transistors 47a and 47b are turned ON is the same for the subordinate pixels Pa and Pb. Therefore, the Cs bus lines 43c(1) and 43c(2) undergo the voltage fluctuation Vcs1 at the same timing.

In this embodiment, the storage capacitors Cs of the subordinate pixels Pa and Pb formed in one pixel A are connected to different Cs bus lines 43c(1) and 43c(2). Then, the Cs bus lines 43c(1) and 43c(2) are connected to different Cs bus lines 43c(5) and 43c(6) by different bridge lines 210(1) and 210(2) (see FIG. 12). The Cs bus line 43c(1) and the Cs bus line 43c(5) which are connected by the bridge line 210(1) are connected to the storage capacitors Cs of pixels connected to different gate bus lines 43b. Similarly, the Cs bus line 43c(2) and the Cs bus line 43c(6) which are connected by the bridge line 210(2) are connected to the storage capacitors Cs of pixels connected to different gate bus lines 43b. Thus, the Cs bus lines 43c(1) and 43c(2) connected to the storage capacitors Cs of the subordinate pixels Pa and Pb formed in one pixel A are connected by the bridge line 210 to the Cs bus lines 43c of the storage capacitors Cs of pixels connected to different gate bus lines 43b.

The voltage fluctuations Vcs1 occur at the same timing on the Cs bus lines 43c(1) and 43c(2) connected to the storage capacitors Cs of the subordinate pixels Pa and Pb formed in one pixel A. However, the Cs bus lines 43c(1) and 43c(2) connected to the storage capacitors Cs of the subordinate pixels Pa and Pb formed in one pixel A are connected by the bridge line 210 to the Cs bus lines 43c of the storage capacitors Cs of pixels that are connected to different gate bus lines 43b. Therefore, the voltage fluctuations Vcs1 (see FIG. 10) occurring at the same timing do not overlap with each other on one Cs bus line 43c. This prevents the voltage fluctuations Vcs1 occurring on the Cs bus lines 43e from overlapping with each other and thus causing a large voltage fluctuation Vcs1.

As described above, a plurality of pixels A may be arranged in a matrix pattern in the liquid crystal panel 10 (display section) of the liquid crystal display device 100. In this case, a plurality of Cs bus lines 43c (storage capacitor lines) are preferably provided in the horizontal direction of the liquid crystal panel 10 as in the embodiment described above, for example. The stem lines 181 to 184 are preferably each connected to Cs bus lines 43c (storage capacitor lines) which are arranged at. regular intervals of several lines in the horizontal direction of the liquid crystal panel 10. A plurality of Cs bus lines 43c connected by the same one of the stem lines 181 to 184 are preferably connected by the bridge line 210. In this case, the bridge line 210 connects a plurality of Cs bus lines 43c connected by the same stem line 180. Therefore, the transfer of the driving signal from the stem lines 181 to 184 to the Cs bus lines 43c can be done appropriately. The bridge line 210 electrically connects together a plurality of Cs bus lines 43c that are connected by the same one of the stem lines 181 to 184. Thus, the influences of the voltage fluctuations (ripples) occurring on the Cs bus lines 43c are reduced by each other.

In this embodiment, each pixel A of the liquid crystal panel 10 includes the R, G and B sub-pixels $A_R$, $A_G$ and $A_B$. As shown in FIGS. 3 and 5, the bridge line 210 is routed so as to pass through the B sub-pixel A. The source bus lines 43a are arranged between the sub-pixels $A_R$, $A_G$ and $A_B$. If it is not possible to provide a space for arranging the bridge line 210 between the sub-pixels $A_R$, $A_G$ and $A_B$, the bridge line 210 may be arranged so as to pass through one of the plurality of sub-pixels $A_R$, $A_G$ and $A_B$.

One of the sub-pixels $A_R$, $A_G$ and $A_B$ on which the bridge line 210 is arranged is preferably selected taking into consideration the characteristics, etc., of the pixels A for the liquid crystal panel 10. For example, a sub-pixel that has a small influence on the transmittance of the pixel as a whole may be selected in order to prevent a decrease in the transmittance of the pixel as a whole. The sub-pixel through which the bridge line 210 is passed may be selected taking into consideration the influence on the hue of the color displayed by the pixel as a whole, for example. For example, where the B sub-pixel $A_B$ of the sub-pixels $A_R$, $A_G$ and $A_B$ has a small influence on the light transmittance of the pixel A as a whole, the bridge line 210 may be passed through the B sub-pixel $A_B$ so as to suppress the influence on the light transmittance of the pixel A as a whole to be small. Where the R sub-pixel $A_R$ of the sub-pixels $A_R$, $A_G$ and $A_B$ has a small influence on the hue of the pixel A as a whole, the bridge line 210 may be passed through the R sub-pixel $A_R$ so as to suppress the influence on the hue of the pixel A as a whole to be small. Similarly, where it is appropriate to pass the bridge line 210 through the G sub-pixel $A_G$, of the sub-pixels $A_R$, $A_G$ and $A_B$, the bridge line 210 can be passed through the sub-pixel $A_G$.

Thus, while the bridge line 210 is passed through the B sub-pixel $A_B$ of the R, G and B sub-pixels $A_R$, $A_G$ and $A_B$ in the embodiment described above, the position where the bridge line 210 is passed is not limited to the embodiment. The bridge line 210 may be passed through another one of the R, G and B sub-pixels $A_R$, $A_G$ and $A_B$. Depending on the configuration of the liquid crystal panel 10, the sub-pixel configuration may not be the R, G and B sub-pixels $A_R$, $A_G$ and $A_B$. In that case, the bridge line is preferably arranged so as to pass through an appropriate one of the plurality of sub-pixels. For example, one bridge line 210 may pass through one sub-pixel (e.g., $A_R$) of the sub-pixels $A_R$, $A_G$ and $A_B$, and another bridge line 210 may pass through another sub-pixel (e.g., $A_G$).

As described above, with the liquid crystal display device 100, the bridge lines 210 for connecting a plurality of Cs bus lines 43c are provided in the liquid crystal panel 10 (display section) as shown in FIGS. 6 and 12. Therefore, it is possible to suppress the voltage fluctuation (ripple) occurring on the Cs bus line 43c to be small. Thus, it is possible to suppress the occurrence of the "side shadow" due to the voltage fluctuation (ripple). While the main purpose here is to suppress the occurrence of the "side shadow" due to the voltage fluctuation (ripple), the present invention is capable of suppressing the voltage fluctuation (ripple) occurring on the Cs bus line 43c and suppressing various problems occurring due to the voltage fluctuation (ripple) to be small.

While the present invention has been described above with an example of the liquid crystal display device 100 as one embodiment of the present invention, the present invention is not limited to the embodiment described above, and various changes can be made thereto.

For example, the specific configuration of the liquid crystal display device is not limited to the embodiment described above. Particularly, various changes can be made in the structure of pixels, e.g., the type of liquid crystal, the alignment structure of liquid crystal, the liquid crystal driving method, the arrangement and structure of thin film transistors, the arrangement and structure of storage capacitors, and how the Cs bus lines 43c (storage capacitor lines), the stem lines 180 and the bridge lines 210 are routed and connected together. In the embodiment described above, one pixel A includes the R, G and B sub-pixels $A_R$, $A_G$ and $A_B$, and each sub-pixel $A_R$, $A_G$, $A_B$ further includes the upper and lower subordinate pixels Pa and Pb. The upper and lower subordinate pixels Pa and Pb operate individually. Thus, the embodiment described above illustrates a multi-drive type liquid crystal panel. The structure of the liquid crystal panel is not particularly limited to the multi-drive type liquid crystal panel. While the pixels are arranged in a matrix pattern, the pixel arrangement is also not particularly limited to a matrix pattern. That is, each pixel is preferably provided with a storage capacitor, and preferably includes a plurality of storage capacitor lines to which the storage capacitors are connected. It is preferred that bridge lines for connecting a plurality of storage capacitor lines are provided in the display section separately from the stem lines for sending the driving signal to the storage capacitor lines.

The embodiment described above illustrates an embodiment where a plurality of stem lines are provided, with a plurality of storage capacitor lines connected to each stem line. In this case, a bridge line connects the storage capacitor lines which are connected to the same stem line. Note that depending on the configuration of the liquid crystal panel, there may be one stem line, and all the storage capacitor lines are connected to the same stem line, transferring the same driving signal. In such a case, the bridge line preferably connects storage capacitor lines that transfer the same driving signal. For example, all the storage capacitor lines may be connected by the bridge line.

Description of Reference Characters
 10 Liquid crystal panel (display section)
 10a Pixel region
 11 Color filter substrate
 12 Array substrate
 13 Liquid crystal layer
 15 Sealant
 17, 18 Polarizer plate
 20 Backlight
 22 Light source
 24 Backlight chassis
 26 Optical sheet
 30 Bezel
 32 Frame
 41 Glass substrate (glass substrate of array substrate)
 42, 42a, 42b Pixel electrode
 43a Source bus line
 43b Gate bus line
 43c Cs bus line (storage capacitor line)
 44 Flattening layer
 46 Alignment film
 47, 47a, 47b Thin film transistor
 51 Glass substrate (glass substrate of color filter substrate)
 52 Black matrix
 53 Color filter
 54 Flattening layer
 55 Counter electrode
 56 Alignment film
 59 Spacer
 71 Source driver
 72 Gate driver
 100 Liquid crystal display device (display device)
 121 Source electrode
 122 Gate electrode
 123, 123a, 123b Drain electrode
 142a, 142b Storage capacitor electrode
 144a, 144b Lead line
 180, 181 to 184 Stem line
 200 Control section
 201 Signal input section
 202 Timing control section
 203 Power supply
 210 Bridge line
 A Pixel
 $A_R$, $A_G$, $A_B$ Sub-pixel
 Cs(Ccs) Storage capacitor
 Clc Condenser operating liquid crystal layer
 Pa, Pb Subordinate pixel
 Vcs1, Vcs2 Voltage fluctuation (ripple)

The invention claimed is:

1. A liquid crystal display device including a display section in which a plurality of pixels are arranged, comprising:
   a storage capacitor provided in each pixel of the display section;
   a plurality of storage capacitor lines to which the storage capacitors are connected;
   a stem line connected to the storage capacitor line for transferring a driving signal to the storage capacitor via the storage capacitor line; and
   a bridge line, separate from the stem line, for connecting a plurality of storage capacitor lines, a plurality of stem lines are provided, and a plurality of storage capacitor lines are connected to each stem line; and
   the bridge line connects together storage capacitor lines that are connected to the same stem line,
   the display section includes a plurality of pixels arranged in a matrix pattern;
   a plurality of stem lines are arranged in a vertical direction of the display section; and
   a plurality of storage capacitor lines are arranged in the horizontal direction of the display section, each storage capacitor line connected to one of the plurality of stem lines, and the storage capacitor lines connected to the same stem line are connected together by the bridge line.

2. The liquid crystal display device of claim 1, wherein the plurality of pixels of the display section include a plurality of sub-pixels, the bridge line is arranged so as to pass through one of the plurality of sub-pixels.

3. The liquid crystal display device of claim 1, wherein the plurality of pixels of the display section include R, G and B sub-pixels, and the bridge line is arranged so as to pass through the R sub-pixel of the R, G and B sub-pixels.

4. The liquid crystal display device of claim 1, wherein the plurality of pixels of the display section include R, G and B sub-pixels, and the bridge line is arranged so as to pass through the G sub-pixel of the R, G and B sub-pixels.

5. The liquid crystal display device of claim 1, wherein the plurality of pixels of the display section include R, G and B sub-pixels, and the bridge line is arranged so as to pass through the B sub-pixel of the R, G and B sub-pixels.

* * * * *